United States Patent [19]

Suzuki et al.

[11] Patent Number: 5,574,591
[45] Date of Patent: Nov. 12, 1996

[54] POLYGON SCANNER AND PRODUCTION PROCESS THEREOF

[75] Inventors: Mitsuo Suzuki, Kita-machi; Yukio Itami, Yokohama; Yoshio Hashimoto, Tokyo; Koji Tsukahara, Sagamihara; Yoshihiro Takahashi, Natori; Takao Abe, Shibata-machi, all of Japan

[73] Assignees: Ricoh Company, Ltd., Tokyo; Tohoku Ricoh Co., Ltd., Miyagi-ken, both of Japan

[21] Appl. No.: 383,929

[22] Filed: Feb. 6, 1995

Related U.S. Application Data

[62] Division of Ser. No. 35,791, Mar. 23, 1993.

[30] Foreign Application Priority Data

Mar. 26, 1992 [JP] Japan .................... 4-067695

[51] Int. Cl.$^6$ .................................. G02B 26/08
[52] U.S. Cl. .................... 359/200; 359/216; 359/900
[58] Field of Search ...................... 359/198–200, 359/212–219, 223, 900; 310/40 R, 46, 90, 90.5; 384/115, 123, 113

[56] References Cited

U.S. PATENT DOCUMENTS

| | | |
|---|---|---|
| 4,691,998 | 9/1987 | Sakagaito et al. |
| 4,836,631 | 6/1989 | Shimazu et al. .............. 310/46 |
| 5,069,515 | 12/1991 | Itami et al. ................. 359/200 |

FOREIGN PATENT DOCUMENTS

| | | |
|---|---|---|
| 3733117 | 4/1988 | Germany . |
| 3926852 | 2/1990 | Germany . |
| 61-236520 | 10/1986 | Japan ........................ 359/200 |

Primary Examiner—James Phan
Attorney, Agent, or Firm—Oblon, Spivak, McClelland, Maier & Neustadt, P.C.

[57] ABSTRACT

A polygon scanner has a lighter rotating shaft on which a polygon mirror is mounted, to prevent a positional deviation of the polygon mirror from the rotating shaft in high speed rotation, in which the rotating shaft is supported through a dynamic pressure air bearing on a fixed shaft, in which the polygon mirror and motor constituent members are mounted on the rotating shaft, and in which the rotating shaft and the polygon mirror are made of respective light weight materials matched with each other in coefficient of thermal expansion, for example of aluminum or an aluminum alloy. Further, an anodic oxide film is formed at least on a portion where the rotating shaft could contact with the fixed shaft, and floating means is provided for constantly floating the rotating shaft relative to the fixed shaft upward in an axial direction thereof. A process for producing the polygon scanner comprises making a predetermined masking on a portion where the rotating shaft could contact with the fixed shaft, prior to an anodic oxidation treatment to form an anodic oxide film on the portion, and then performing the anodic oxidation treatment, whereby, during the treatment, forming an anodic oxide film and a pattern of recesses and protrusions for dynamic pressure generation corresponding to a pattern of the masking, which are constituent elements of a dynamic pressure air bearing.

1 Claim, 4 Drawing Sheets

POLYGON SCANNER AND PRODUCTION PROCESS THEREOF

This is a division, of application Ser. No. 08/035,791 filed on Mar. 23, 1993.

BACKGROUND OF THE INVENTION

1. Field of the Invention

The present invention relates to a polygon scanner and a production process thereof.

2. Description of the Related Art

A polygon scanner is provided for beam deflection and scan in image forming apparatuses such as laser printers and digital copiers. It is required that the polygon scanner rotate at a high speed to meet a recent demand for higher image forming speed.

The polygon scanner of this type is for example constructed as follows. A plurality of recesses and protrusions for dynamic pressure generation, for example herringbone grooves, are formed on an outer peripheral surface of a fixed shaft. A cylindrical rotating shaft covers the fixed shaft with a certain bearing clearance to form a radial dynamic pressure air bearing as will be referred to simply as an air bearing. A polygon mirror or rotary multiple facet mirror is mounted on the rotating shaft. In this arrangement, either a dynamic pressure bearing or a magnetic bearing is employed as a thrust bearing for positioning and supporting the rotating shaft in the axial direction thereof. The fixed shaft and the rotating shaft both are made of stainless steel, and the pattern of recesses and protrusions for dynamic pressure generation is formed for example by etching. Since the polygon mirror is required to be finished at a high accuracy and to be light, aluminum is frequently used for forming the polygon mirror.

There is another type of polygon scanner using a bearing with an enhanced wear and abrasion resistance, which is not a non-contact bearing. In such a case, for example in order to make a difference of hardness between a rotating shaft and a fixed shaft, a suitable heat treatment is effected on either one of the rotating shaft and the fixed shaft, which has a lower hardness than the other so as to prevent seizing and to assure the wear and abrasion resistance. For example, Japanese Patent Laying Open Application No. 53-108461 describes a bearing device, which is not a non-contact bearing, in which a member supporting the rotating shaft is made of aluminum or an aluminum alloy, and in which an anodic oxide film is chemically formed on the member to improve the wear and abrasion resistance.

However, the former example of conventional polygon scanner, that is, the conventional dynamic pressure air bearing type polygon scanner, has the following problems, because the rotating shaft is made of stainless steel.

(1) Since the rotating shaft (of stainless steel) has a high specific gravity, it is readily affected by vibration from disturbance, which causes the rotating shaft to contact with the fixed shaft made of a similar material so as to result in seizing. Thus, in order to prevent the seizing, the bearing clearance must be set at a high accuracy with an increased bearing stiffness, which requires a very high dimensional accuracy of each shaft, increasing the production cost.

(2) Since a thermal expansion coefficient (coefficient of linear expansion) of the polygon mirror is greatly different from that of the rotating shaft, heat during high speed rotation causes a slight deviation (of about several μ) in a portion where the polygon mirror is mounted on the rotating shaft, which causes a problem of large vibration of the polygon scanner in high speed rotation. Thus, in order to prevent such a defect, the polygon mirror is inspected in assembly process while rotated at a high speed, which results in an increase of production cost.

(3) Since the rotating shaft has slight magnetism, fine dust is easy to attach to the rotating shaft. The fine dust could cause a damage on the bearing, so that a troublesome dust removing operation is necessary. This also increases the production cost.

The latter example of the conventional polygon scanner has the following problem.

(4) Since the polygon scanner is not of non-contact bearing type, it has a limit in speed increase, which cannot meet the recent demand for higher image forming speed.

SUMMARY OF THE INVENTION

It is, therefore, an object of the present invention to provide a polygon scanner of low production cost which can prevent a positional deviation of a polygon mirror from a rotating shaft during high speed rotation and which is suitable for high speed operation with less vibration.

It is another object of the invention to provide a polygon scanner of low production cost which can securely prevent vibration and seizing.

It is a further object of the present invention to provide a process for producing the polygon scanner at a reduced number of man-hour in production of a bearing portion.

The above objects can be achieved by a polygon scanner in which a rotating shaft is supported through a dynamic pressure air bearing on a fixed shaft and in which a polygon mirror and a motor constituent member are mounted on the rotating shaft, wherein the rotating shaft and the polygon mirror are made of respective light weight materials matched with each other in coefficient of thermal expansion.

In one aspect of the invention, the fixed shaft is made of stainless steel and the rotating shaft is made of aluminum or an aluminum alloy.

The above objects of the invention can be also achieved by a polygon scanner in which a rotating shaft is supported through a dynamic pressure air bearing on a fixed shaft and in which a polygon mirror and a motor constituent member are mounted on the rotating shaft: wherein the fixed shaft and the rotating shaft are respectively made of aluminum or an aluminum alloy; wherein an anodic oxide film is formed at least on a portion where the rotating shaft could contact with the fixed shaft; and wherein floating means is provided for constantly floating the rotating shaft relative to the fixed shaft in an axial direction thereof.

In a further aspect of the invention, a mirror mounting surface of the rotating shaft onto which the polygon mirror is mounted is an exposed surface of the base material forming the rotating shaft, and the mirror mounting surface is located above the dynamic pressure air bearing.

The above objects can be also achieved by a process for producing the polygon scanner comprising: making a predetermined masking on a portion where a rotating shaft could contact with a fixed shaft, prior to an anodic oxidation treatment to form an anodic oxide film on the portion; and then performing the anodic oxidation treatment, whereby, during the treatment, forming an anodic oxide film and grooves for dynamic pressure generation corresponding to a pattern of the masking, which are constituent elements of a dynamic pressure air bearing.

Since the rotating shaft and the polygon mirror are made of the respective light weight materials having the matched thermal expansion coefficient, the inertia of these rotating members may be reduced, and a balance displacement due to a deviation of the mirror mounting position in thermal expansion may be also prevented. As a result, the seizing, which could be caused by vibration and disturbance during high speed rotation, may also be avoided, and, therefore, the polygon scanner suitable for high speed operation may be provided at a low production cost with less vibration.

The fixed shaft is made of stainless steel and the rotating shaft is of aluminum or an aluminum alloy, whereby reducing the inertia of rotating members to decrease the vibration during high speed rotation and increasing the stiffness of the fixed shaft to facilitate miniaturization of the scanner.

The fixed shaft and the rotating shaft are made of aluminum or an aluminum alloy nonmagnetic and excellent in processability, whereby making the rotating members lighter to improve the resistance to vibration and improving the processability of the fixed shaft and the rotating shaft. Further, the nonmagnetic property reduces adhesion of dust to the shafts, obviating the dust removing process so as to reduce the production cost. Additionally, the anodic oxide film is formed at least on a portion where the rotating shaft could contact with the fixed shaft, and the floating means is provided for constantly floating the rotating shaft relative to the fixed shaft, whereby improving the wear and abrasion resistance and securely preventing the seizing so as to improve the durability.

The mirror mounting surface of the rotating shaft onto which the polygon mirror is mounted is the exposed surface of the base material forming the rotating shaft, so that the polygon mirror may match the base material of the rotating shaft in thermal expansion coefficient, whereby improving the resistance to vibration and increasing the surface hardness in the contact area between the dynamic pressure air bearing and the rotating shaft so as to obtain a desired wear and abrasion resistance.

The mirror mounting surface of the rotating shaft is located above the dynamic pressure air bearing, so that the portion below the mirror mounting surface may be dipped into an electrolytic solution during the anodic oxidation treatment of the rotating shaft, whereby an anodic oxide film may be readily formed in a necessary area without masking.

While the predetermined masking is provided on the portion where the rotating shaft could contact with the fixed shaft, prior to the anodic oxidation treatment, the grooves for dynamic pressure generation may be produced at the same time with the anodic oxide film being selectively grown in the anodic oxidation treatment, so as to form the dynamic pressure air bearing, greatly decreasing the number of man-hour.

Further objects and advantages of the present invention will be apparent from the following description of the preferred embodiments of the invention as illustrated in the accompanying drawings.

DESCRIPTION OF THE PREFERRED EMBODIMENTS

The preferred embodiments according to the present invention will be described with reference to the accompanying drawings.

FIRST EMBODIMENT

Figure 1:
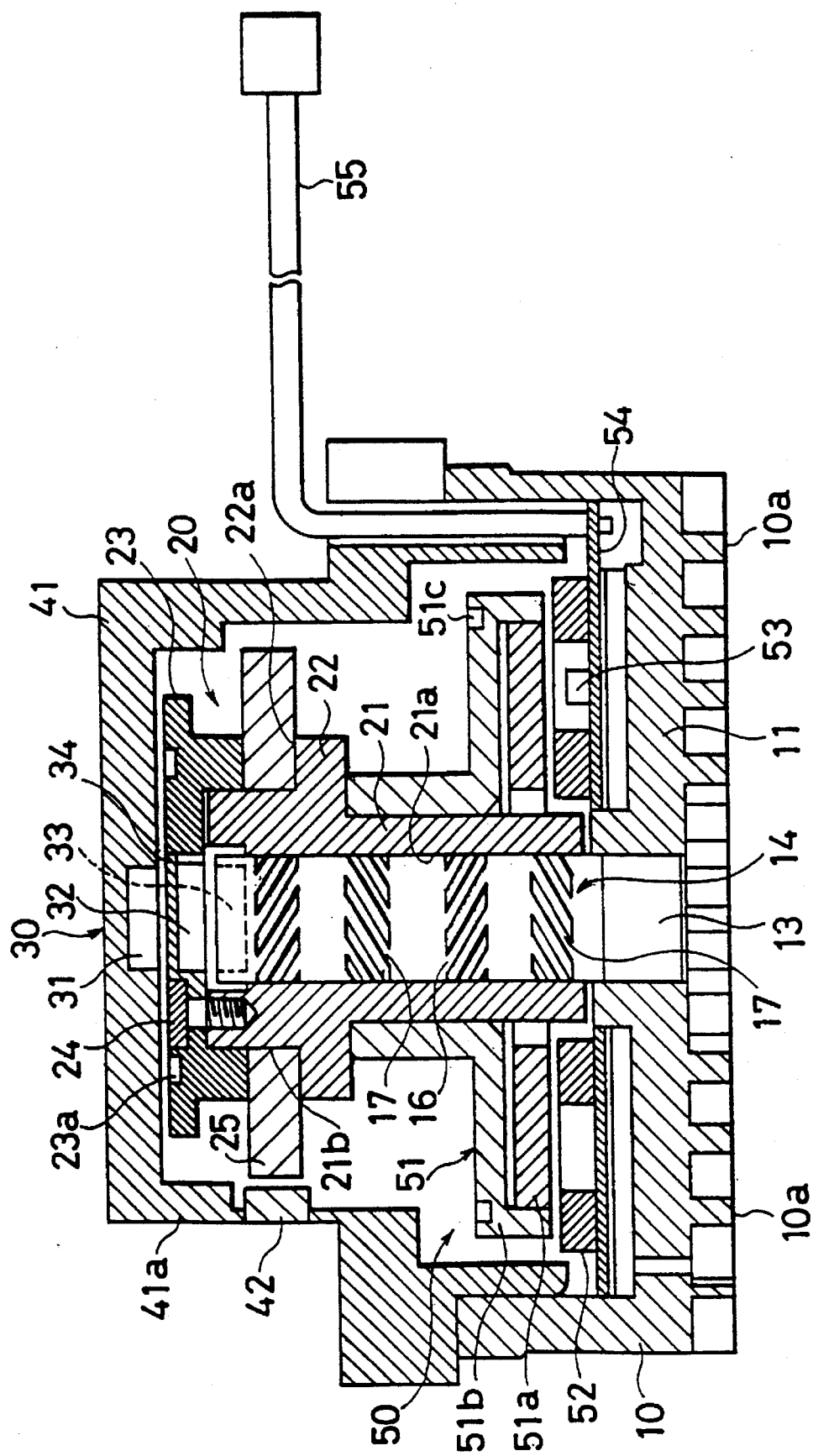
FIG. 1 is a cross sectional view to show an entire structure of an embodiment of a polygon scanner according to the present invention.
Figure 2:
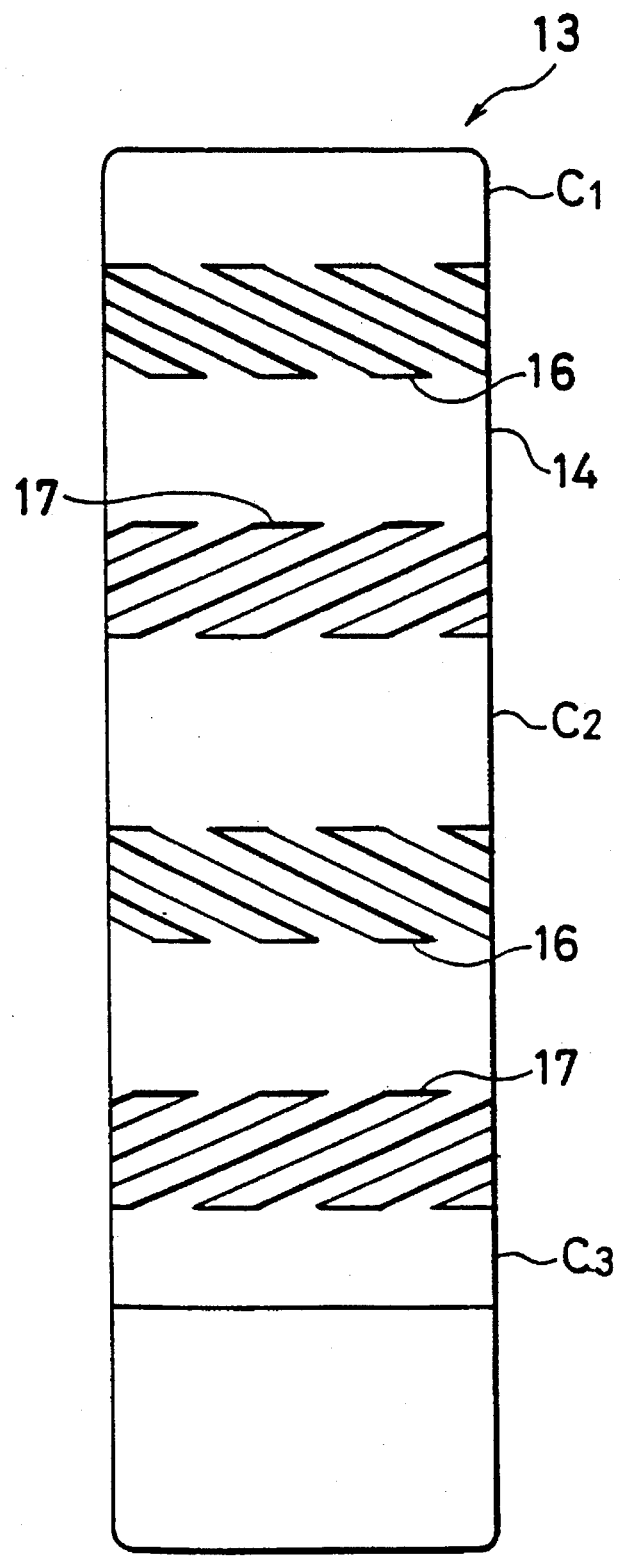
FIG. 2 is an enlarged elevation of a fixed shaft in the scanner.

FIG. 1 and FIG. 2 are drawings to show an embodiment of a polygon scanner according to the present invention.

In FIGS. 1 and 2, numeral 10 designates a motor housing, and 11 a fixed shaft pedestal forming the bottom of the motor housing 10. A fixed shaft 13 is vertically fit into the center of the fixed shaft pedestal 11 to be fixed therein (for example fixed by shrink fit). A radial bearing surface 14 (dynamic pressure air bearing) is provided on an outer periphery of the fixed shaft 13, and two pairs of herringbone grooves 16, 17 for dynamic pressure generation are formed at equal intervals in the circumferential direction on the radial bearing surface 14. The radial bearing surface 14 faces an inner periphery surface 21a of a cylindrical rotating shaft 21. The radial bearing surface 14 and the inner periphery surface 21a of the rotating shaft 21 are separate from each other at a predetermined bearing clearance, whereby the rotating shaft 21 is rotatable relative to the fixed shaft 13.

A mirror support flange 22 is formed at an upper portion of the rotating shaft 21, on which a mirror keeper 23 and a polygon mirror 25 are mounted. The polygon mirror 25 has a close fit on an upper outer periphery surface 21b, and a bolt 24 is screwed into the top of the rotating shaft 21 to press the polygon mirror 25 through the mirror keeper 23 toward the flange 22. The mirror keeper 23 holds a magnet 32 constituting a part of an axial magnetic bearing 30 at the center thereof, and has a fine pore 34 for vertical vibration attenuation to provide the axial magnetic bearing 30 with a damping property. Balance correcting grooves 23a for correcting an imbalance of a rotor 20 are also formed on the top surface of the mirror keeper The axial magnetic bearing 30 comprises three magnets 31, 32, 83 repelling each other on the axis of the fixed shaft 13. The magnet 81 is installed in an upper case 41 above the magnet 32, and the magnet 33 is fixed at the top end of the fixed shaft 13, whereby the rotor 20 composed of the rotating shaft 21, the mirror keeper 23, the polygon mirror 25, and the magnet 32 is urged to constantly float above the fixed shaft 13 while being supported in a non-contact state. In other words, the axial magnetic bearing 30 is floating means for constantly floating the rotating shaft 21 in the axial direction relative to the fixed shaft 18. A deflection window 42 is formed by cutting a part of a peripheral wall 41a of the upper case 41.

Numeral 50 is a brushless motor of disk facing type for driving the polygon mirror 25. The motor 50 has a rotor magnet assembly 51 fixed on the rotating shaft 21, a stator coil portion 52 facing the bottom surface of the assembly 51, and a Hall element 53. The rotor magnet assembly is a motor component, in which a magnet portion 51a is set through a magnet holder 51b on the rotating shaft 21 in a unit form. The stator coil portion 52 is excited in a predetermined excitation method by a driver section (not shown) disposed on a print-circuit board 54 to rotate the rotor magnet assembly 51, whereby rotating the rotating shaft 21 and the polygon mirror 25 (rotor 20). When the polygon mirror 25 starts rotating, air in the herringbone grooves 16, 17 formed on the radial bearing surface 14 of the fixed shaft 13 is urged in the rotating direction of the rotating shaft 21 while being squeezed, and is drained off into the bearing clearance between the fixed shaft 18 and the rotating shaft 21 so as to generate the dynamic pressure. When the dynamic pressure reaches a certain pressure, the rotating shaft 21 completely floats (in the radial direction) relative to the fixed shaft 18 to be kept in a non-contact state as being rotatable at a high speed. In FIG. 1, numeral 51c denotes balance correction grooves for imbalance correction, and 55 a connector cable for connecting the print-circuit board 54 to the outside. Further, numeral 10a represents a plurality of fins formed on the bottom surface of the housing 10.

The rotating shaft 21 and the polygon mirror which are main constituent members of the rotor shaft 20, are made of light weight materials matched with each other in coefficient of thermal expansion (linear expansion coefficient), for example of aluminum (linear expansion coefficient: $2.4 \times 10^{-5}(1/°C.)$) or an aluminum alloy. An unrepresented hard alumite layer (anodic oxide film) is formed by the hard alumite treatment (anodic oxidation treatment) on at least a portion of the inner periphery surface 21a of the rotating shaft 21 which could contact with the fixed shaft 13. The hard alumite treatment is a treatment in which a cathode of carbon or the like and an anode of the rotating shaft 21 are dipped into a predetermined electrolytic solution (aqueous solution of oxalic acid, sulfuric acid, etc.) While connected to a direct current source and in which a surface of the rotating shaft 21 is oxidized by an oxidation reaction caused on the rotating shaft 21 (anode) through electrolysis in the electrolytic solution to form the anodic oxide film. In this treatment, most of the inner periphery surface 21a of the rotating shaft 21 is dipped into the electrolytic solution. A masking is provided during the hard alumite treatment on the top surface 22a of the flange 22 and the upper outer peripheral surface 21b of the rotating shaft 21, which will be surfaces on which the polygon mirror 25 is mounted, whereby the masked surfaces become exposed surfaces of the basic material (aluminum or aluminum alloy) forming the rotating shaft 21. Alternatively, the rotating shaft 21 may be polished after the treatment so as to have necessary dimensions as exposing the base material (aluminum or aluminum alloy). Thus, the hard alumite layer, which has a linear expansion coefficient of $0.5 \times 10^{-5}(1/°C.)$ different from that of the base material, is not formed on the mirror mounting portion of the rotating shaft 21, so that the mirror mounting portion has the thermal expansion coefficient and the outer diameter strictly coincident with those of the polygon mirror 25.

On the other hand, the fixed shaft 13 is also made of aluminum or an aluminum alloy (preferably a corrosion resisting aluminum alloy selected from Series of #5000 and #6000) similarly as the rotating shaft 21. Also, a hard alumire layer (anodic oxide film) is formed on a portion of the outer periphery surface of the fixed shaft 13 which could contact with the rotating shaft 21, in the same manner as on the rotating shaft 21. The inner peripheral upper edge of the rotating shaft 21 has a slightly enlarged diameter to provide a relief for the rotating shaft 21, and therefore the hard alumite treatment is effected on the radial bearing surface 14 and on the side below it.

It is preferable that in addition to the hard alumite treatment as described a so-called Tufram treatment (registered trademark; available from ULVAC JAPAN, Ltd.), in which polytetrafluoroethylene ("Teflon": registered trademark) is impregnated in the alumite treated portion, be effected to provide lubricity, whereby improving the resistance to seizing.

Next explained is an embodiment of a process for producing the polygon scanner as so arranged according to the present invention.

After the fixed shaft 13 is obtained by cutting (or grinding) in a predetermined shape, the fixed shaft 13 is subjected to the hard alumite treatment. A masking of a predetermined pattern is provided in the well-known procedure on necessary portions on the radial bearing surface 14 of the fixed shaft 13 prior to the hard alumite treatment. The masking is for avoiding the anodic oxidation reaction on the selected portions, which is given for example over hatched portions $C_1$–$C_3$(as will be referred to as hatched portion C) as shown in FIG. 2. The fixed shaft 13 is then subjected to the hard alumite treatment with the masking thereon. The hard alumite treatment on the fixed shaft 13 is the same as that on the rotating shaft 21, using a certain electrolytic solution (aqueous solution of oxalic acid, sulfuric acid, or the like), the cathode of carbon, and the direct current source. The fixed shaft 13 connected to the direct current source is dipped into the electrolytic solution such that the lower end portion and the portion of the radial bearing surface 14 of the fixed shaft 13 are in the electrolytic solution. The surface of the fixed shaft 13 is selectively oxidized by the oxidation reaction caused on the fixed shaft 13 (anode) through electrolysis in the electrolytic solution, whereby hardening areas except for the masked region by the anodic oxidation. An alumite layer is not grown on the hatched portion C, but a hard alumite layer is grown on the anode-oxidized portions to increase the diameter thereby. Recesses comprising the herringbone grooves 16, 17 for dynamic pressure generation (as will be also referred to as a recessed portion C) are formed in depth of several μ to several ten's μ corresponding to the thickness of the alumite layer in the pattern of the masking on the hatched portion C. The depth of the recessed portion C may be adjusted by changing conditions for example of a temperature and/or a concentration of the electrolytic solution, and/or a treatment time.

A fabrication such as grinding of outer diameter is then effected in accordance with a required accuracy of dimensions, so that the upper outer periphery surface 21b of the fixed shaft 13 and the top surface 22a of the mirror support flange 22 may be finished in the desired accuracy of shape.

In the present embodiment as so arranged, since the rotating shaft 21 and the polygon mirror 25 are made of aluminum or an aluminum alloy (light weight material), which are matched in coefficient of thermal expansion, the inertia of the rotor 20 may be minimized while preventing a balance displacement, which could be caused if the polygon mirror 25 is to be deviated relative to the rotating shaft 21 due to a thermal expansion, whereby reducing the vibration during high speed rotation. Therefore, the present invention can obviate the process for vibration inspection of the rotor 20 at high speed rotation in production process, which results in reduction of the production cost.

Further, since the rotating shaft 21 and the polygon mirror 25 are made of aluminum or its alloy nonmagnetic and excellent in processability, dust is unlikely to attach to the fixed shaft 18 and the rotating shaft 21, reducing costs for processing the parts and the production cost.

Moreover, the rotor 20 is constantly floated by the axial magnetic bearing 30 relative to the fixed shaft 13, which could only allow a point contact or a line contact if the rotating shaft 21 should contact with the fixed shaft 13, and the portions which could contact with each other have the surface hardness enhanced by the hard alumite treatment, whereby securely preventing the seizing and improving the durability. In this respect, the hard alumite layer is not easy to be peeled off while a plated layer is easy. This highly increases the reliability of the scanner according to the present invention. A repetitive test of start and stop was carried out for example. Repetitions of 20,000 showed no seizing or no abnormal rotation (such as deflecting rotation).

Also in the present embodiment, the herringbone grooves 16, 17 for dynamic pressure generation can be made simultaneously with the surface treatment on the fixed shaft 18 while selectively growing the hard alumite layer in hard alumite treatment, whereby greatly decreasing the number of man-hour.

Although the light weight material for making the rotating shaft 21 is aluminum or an aluminum alloy in the present embodiment, the material is not limited to those. For example, if the polygon mirror 25 is a mirror made of a resin, the rotating shaft 21 may be made of a resin matching the mirror resin in coefficient of thermal expansion. Also, the pattern of recesses and protrusions for dynamic pressure generation in the dynamic pressure air bearing is arbitrarily determined, and the rotating shaft 21 may have such recesses and protrusions instead of the fixed shaft 13, or, the fixed shaft 13 and the rotating shaft 21 both may have the recesses and protrusions.

SECOND EMBODIMENT

Figure 3:
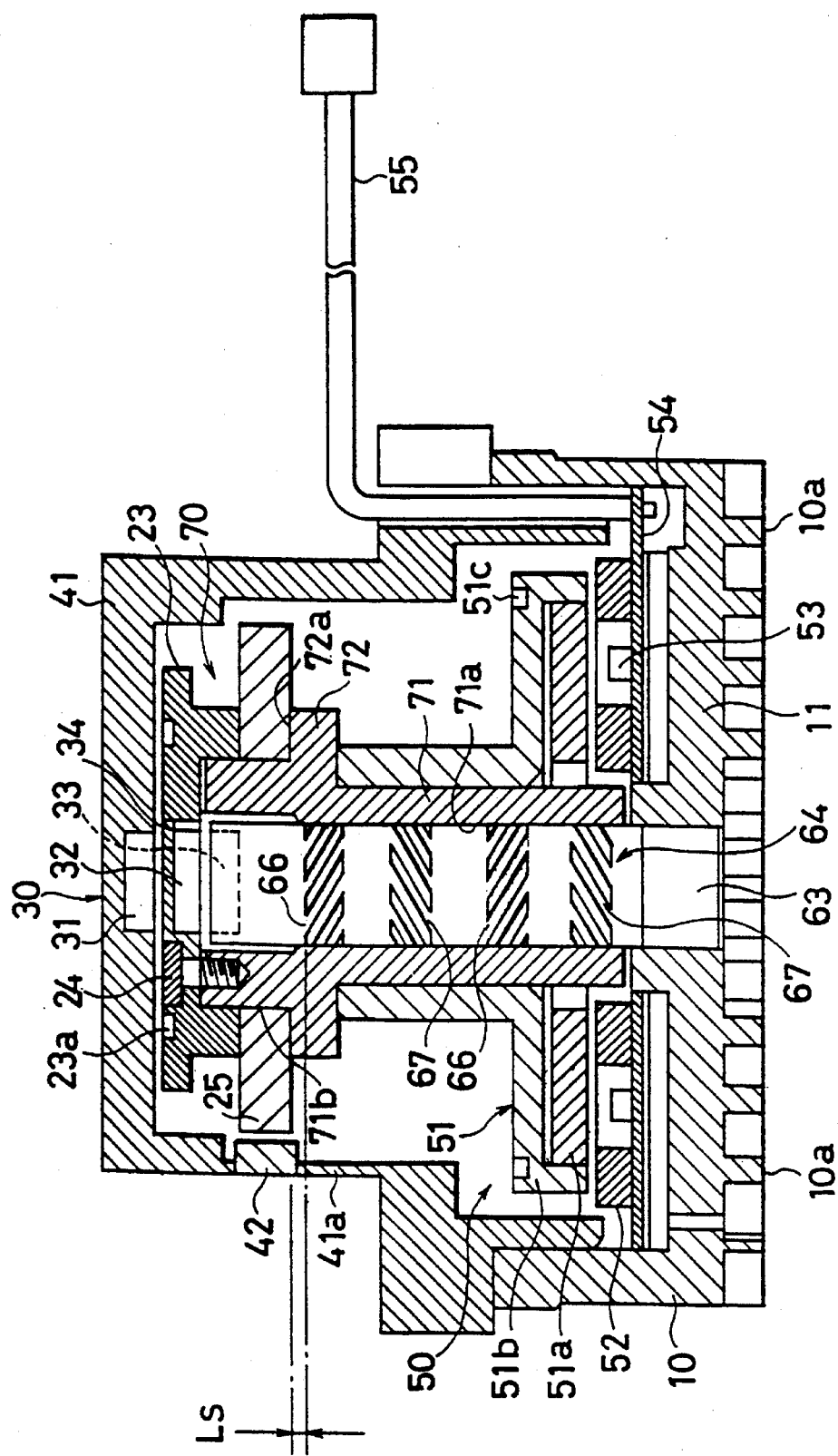
FIG. 3 is a cross sectional view to show an entire structure of another embodiment of the polygon scanner according to the present invention.
Figure 4:
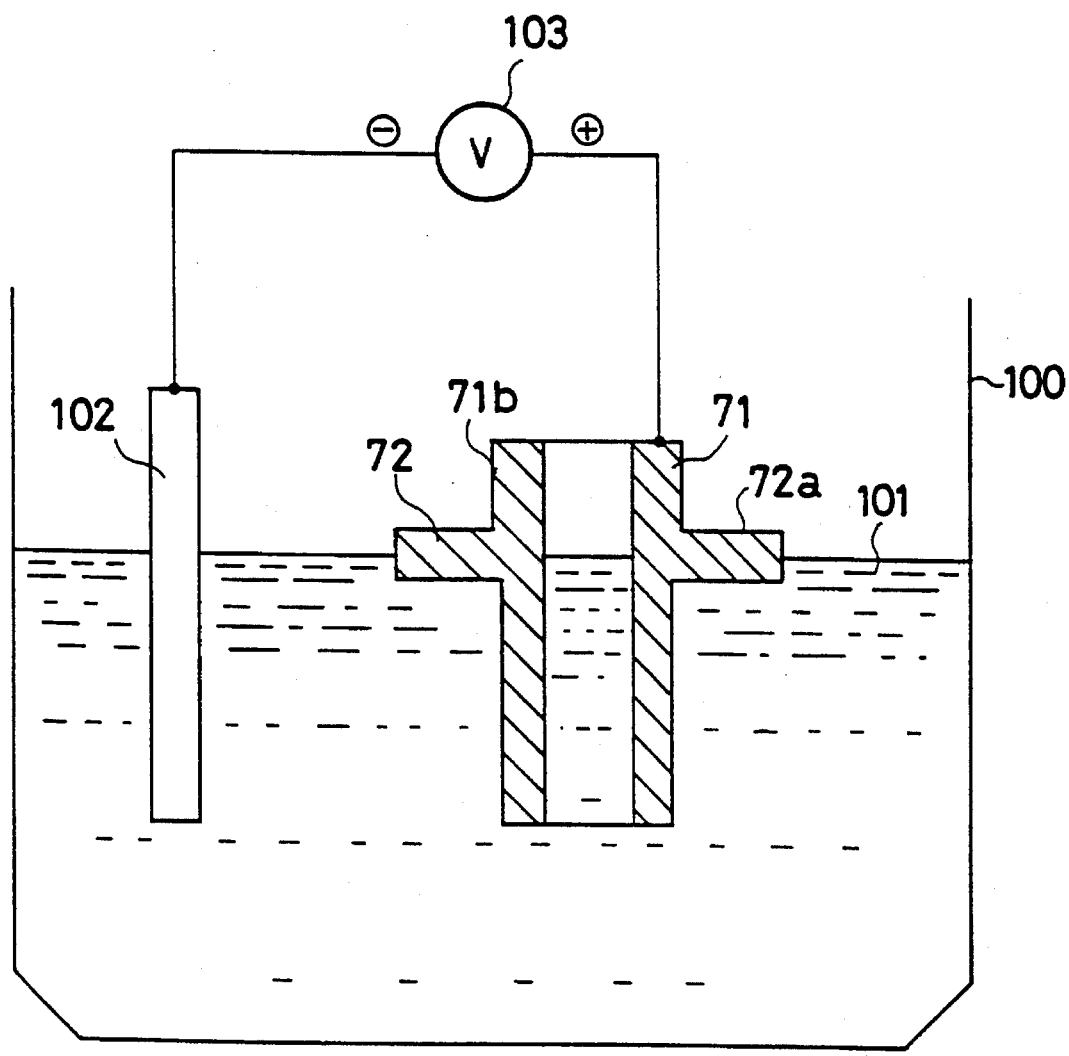
FIG. 4 is a schematic constitutional drawing to show a treatment system for anodic oxidation treatment of a rotating shaft in the scanner.

FIG. 3 and FIG. 4 are drawings to show another embodiment of the dynamic pressure air bearing type polygon scanner according to the present invention. The same components are given the same numerals as in the above embodiment and are omitted to explain.

In FIG. 3, a fixed shaft 63 is vertically fit and fixed in the central portion of a fixed shaft pedestal 11. A radial bearing surface 64 (dynamic pressure air bearing) is provided on the outer periphery of the fixed shaft 63, and herringbone grooves 66, 67 for dynamic pressure generation are formed circumstantially at equal pitches on the radial bearing surface 84. The radial bearing surface 64 opposes to an inner periphery surface 71a of a rotating shaft 71, such that the radial bearing surface 84 is separated at a certain bearing clearance from the inner periphery surface 71a of the rotating shaft 71, whereby the rotating shaft 71 is rotatable relative to the fixed shaft mirror support flange 72 is formed at an upper portion of the rotating shaft 71, and a polygon mirror 25 fits on an upper outer periphery surface 71b (mirror mounting surface) of the rotating shaft 71. A bolt 24 is screwed into the top of the rotating shaft 71 so as to urge the polygon mirror 25 toward a top surface 72a (mirror mounting surface) of the flange 72 through a mirror keeper 23. The top surface 72a of the mirror support flange 72 is located above the radial bearing surface 64 at a distance $L_s$ from the upper edge thereof as shown. The members rotating together with the rotating shaft 71 constitute a rotor 70.

When the polygon mirror 25 starts rotating, air in the herringbone grooves 66, 67 formed on the radial bearing surface 64 of the fixed shaft 63 is pushed and squeezed in the rotation direction of the rotating shaft 71 and is drained off into the bearing clearance between the fixed shaft 88 and the rotating shaft 71 so as to generate a dynamic pressure. When the dynamic pressure reaches a certain pressure, the rotating shaft 71 fully floats (in the radial direction) relative to the fixed shaft 83, becoming ready to rotate at a high speed.

The rotating shaft 71 and the polygon mirror 25, which are main constituent members of the rotor 20, are made of light weight materials matched in coefficient of thermal expansion, for example of aluminum or an aluminum alloy. An unrepresented hard alumite layer (anodic oxide film) is formed by the hard alumite treatment (anodic oxidation treatment) at least on a portion of the inner periphery surface 71a of the rotating shaft 71 which could contact with the fixed shaft 63. This treatment is as follows. For example as shown in FIG. 4, a cathode portion 102 of carbon and an anode portion of the rotating shaft 71 are dipped into an electrolytic solution 101 (aqueous solution of oxalic acid, sulfuric acid, etc.) in an electrolytic cell 100, and the cathode and the anode are connected to a direct current source 103. The surface of the rotating shaft 71 is partially oxidized to form an anodic oxide film by the oxidation reaction caused on the surface of the rotating shaft 71 (anode) through electrolysis in the electrolytic solution 101. In this treatment, since a portion of the inner periphery surface 71a of the rotating shaft 71 facing the fixed shaft 63 is located below the top surface 72a of the mirror support flange 72, only the portion below the top surface 72a of the flange 72 is dipped into the electrolytic solution 102 as shown without masking on the upper portion so as to effect the necessary treatment on the dipped portion. Thus, the alumite treatment is not effected on the top surface 72a of the flange 72 and on the portion above the top surface 72a in the treatment, so that the top surface 72a of the flange 72 and the upper outer periphery surface 71b of the rotating shaft 71, which are the mounting surfaces of the polygon mirror 25, may be exposed surfaces of the base material (aluminum or aluminum alloy) forming the rotating shaft 71, whereby the dimension accuracy and the thermal expansion coefficient of the rotating shaft 71 closely match with those of the polygon mirror 25.

The fixed shaft 63 is made for example of stainless steel and is hardened under predetermined conditions, and the herringbone grooves 66, 67 for dynamic pressure generation on the radial bearing surface 64 are formed by etching.

In the present embodiment as so arranged, the fixed shaft 63 is made of stainless steel and the rotating shaft 71 (and the polygon mirror 25) is formed of aluminum or an aluminum alloy, whereby improving the resistance to vibration through the weight reduction of the rotor 20 and providing the fixed shaft 63 with sufficient stiffness even in small diameter because of the high Young's modulus of the fixed shaft 63, achieving a more compact air bearing type polygon scanner.

Also in the present embodiment, the upper outer periphery surface 71b of the rotating shaft 71 and the mirror mounting surface 72a of the mirror support flange 72 onto which the polygon mirror 25 is mounted are exposed surfaces of the base material (aluminum or aluminum alloy) forming the rotating shaft 71, so that the mirror mounting portion may be matched in thermal expansion coefficient and dimension accuracy with the polygon mirror 25. Further, since the top surface 72a of the flange 72 of the rotating shaft 71 onto which the polygon mirror 25 is mounted is located further above the upper edge of the portion opposing to the radial bearing surface 64 (dynamic pressure air bearing) on the fixed shaft 63, so that when the radial bearing surface 64 is subjected to the hard alumite treatment the portion below the mirror mounting portion (surfaces 17b, 17a) of the rotating shaft 71 may be dipped into the electrolytic solution 101 without masking, so as to increase the surface hardness of the portion opposing to the radial bearing surface 84 to a desired value, whereby the surface treatment operation may be simplified.

Many widely different embodiments of the present invention may be constructed without departing from the spirit and scope of the present invention. It should be understood that the present invention is not limited to the specific embodiments described in the specification, except as defined in the appended claims.

What is claimed is:

1. A process for producing a polygon scanner in which a rotating shaft is supported through a dynamic pressure air bearing on a fixed shaft and in which a polygon mirror and a rotor magnet assembly are mounted on said rotating shaft, wherein each of said fixed shaft, said rotating shaft and said polygon mirror is made of an aluminum alloy to match in coefficient of thermal expansion, and wherein an anodic oxide film is formed on each of surfaces of said fixed shaft and said rotating shaft opposite to each other, the process comprising the steps of:

making a masking on a predetermined portion of a fixed shaft contacting with a rotating shaft, prior to an anodic oxidation treatment to form an anodic oxide film; and performing said anodic oxidation treatment, whereby, during said treatment, forming an anodic oxide film and a pattern of recesses and protrusions for dynamic pressure generation corresponding to a pattern of said masking, which are constituent elements of a dynamic pressure air bearing.

* * * * *